(12) United States Patent
Chang et al.

(10) Patent No.: US 9,329,632 B2
(45) Date of Patent: May 3, 2016

(54) DOCKING STATION

(71) Applicant: ASUSTeK COMPUTER INC., Taipei (TW)

(72) Inventors: Shu-Chwen Chang, Taipei (TW); Hsuan-Wu Wei, Taipei (TW); Chia-Chang Tsui, Taipei (TW); Sheng-Ta Lin, Taipei (TW); Tsung-Ju Chiang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 14/338,995

(22) Filed: Jul. 23, 2014

(65) Prior Publication Data

US 2015/0029657 A1    Jan. 29, 2015

Related U.S. Application Data

(60) Provisional application No. 61/857,588, filed on Jul. 23, 2013.

(30) Foreign Application Priority Data

Jun. 11, 2014   (TW) .............................. 103120193 A

(51) Int. Cl.
| | |
|---|---|
| *G06F 1/16* | (2006.01) |
| *F16M 13/00* | (2006.01) |
| *F16M 11/04* | (2006.01) |
| *F16M 11/10* | (2006.01) |

(52) U.S. Cl.
CPC ........... *G06F 1/1632* (2013.01); *F16M 11/041* (2013.01); *F16M 11/10* (2013.01); *F16M 13/00* (2013.01); *F16M 2200/08* (2013.01)

(58) Field of Classification Search
CPC ....... G06F 1/1669; G06F 1/1632; G06F 1/66; G06F 1/1654; G06F 1/1618
See application file for complete search history.

(56) References Cited

U.S. PATENT DOCUMENTS

| | | | |
|---|---|---|---|
| 6,208,508 B1 | 3/2001 | Ruch et al. | |
| 6,700,773 B1 * | 3/2004 | Adriaansen | ........... G06F 1/1618 345/156 |

(Continued)

FOREIGN PATENT DOCUMENTS

| | | |
|---|---|---|
| CN | 102609054 | 7/2012 |
| CN | 102609055 | 7/2012 |

(Continued)

*Primary Examiner* — Hoa C Nguyen
*Assistant Examiner* — Xanthia C Cunningham
(74) *Attorney, Agent, or Firm* — Muncy, Geissler, Olds & Lowe PC

(57) ABSTRACT

A docking station for a portable electronic device is provided. The docking station includes a main body, a supporting structure and a pivot. The pivot includes a first fixing portion, a second fixing portion and a pivot portion. The first fixing portion is disposed at the supporting structure, the second fixing portion is disposed at the main body. The pivot portion is connected to the first fixing portion and the second fixing portion. When the portable electronic device is disposed at the supporting structure, the portable electronic device and the supporting structure can rotate relative to the main body via the pivot. The docking station allows the portable electronic device disposing at the docking station drives the supporting structure to rotate relatively to the main body alone the axis of the pivot to stand in vertical, and then the horizontal space of the portable electronic device is saved.

5 Claims, 11 Drawing Sheets

(56) References Cited

U.S. PATENT DOCUMENTS

| | | | |
|---|---|---|---|
| 6,854,984 B1* | 2/2005 | Lee | G06K 19/07732 439/607.41 |
| 2010/0134984 A1 | 6/2010 | Lum et al. | |
| 2010/0177476 A1 | 7/2010 | Hotelling et al. | |
| 2012/0218722 A1* | 8/2012 | Yu | F16M 11/041 361/747 |
| 2013/0166808 A1 | 6/2013 | Yu | |
| 2013/0322011 A1* | 12/2013 | Yeh | G06F 1/181 361/679.44 |

FOREIGN PATENT DOCUMENTS

| | | |
|---|---|---|
| CN | 102654781 | 9/2012 |
| TW | M439836 U | 10/2012 |
| TW | 201328528 | 7/2013 |
| TW | 201349996 | 12/2013 |

\* cited by examiner

DOCKING STATION

CROSS-REFERENCE TO RELATED APPLICATION

This application claims the priority benefit of U.S. provisional application Ser. No. 61/857,588, filed on Jul. 23, 2013 and Taiwan application serial no. 103120193, filed on Jun. 11, 2014. The entirety of the above-mentioned patent applications are hereby incorporated by reference herein and made a part of specification.

BACKGROUND OF THE INVENTION

1. Field of the Invention

The invention relates to a docking station and, more particularly, to a docking station for an electronic device.

2. Description of the Related Art

As technology develops, the demand of various electronic devices is increased, and the demand of the electronic devices is various in different occasions. For example, a portable electronic device, such as a notebook, a tablet, is suitable for taking along with. The portable electronic device becomes smaller and thinner, and thus the size of the screen becomes small, the space for the keyboard is limited (or even the physical keyboard is omitted), and the peripheral connecting ports are not enough. Consequently, when users has to operate the portable electronic device for a long time, (such as at the office or at home), the portable electronic device is connected to an expansion device, such as a screen, a keyboard, a power cable, a network cable, for improving the efficiency in use. Therefore, a docking station simultaneously having multiple signal transmitting components is launched.

In detail, the expansion device (such as a screen, a keyboard, a power cable, a network cable) is connected to a signal transmitting component of the docking station first, and the docking station is disposed at the place where the portable electronic device is usually used. The portable electronic device can be disposed at the docking station directly, and connects to other docking devices via the docking station without connecting to the expansion devices one by one.

BRIEF SUMMARY OF THE INVENTION

A docking station for a portable electronic device is provided. The docking station includes a main body, a supporting structure and a pivot. The pivot includes a first fixing portion, a second fixing portion and a pivot portion. The first fixing portion is disposed at the supporting structure, the second fixing portion is disposed at the main body. The pivot portion is connected to the first fixing portion and the second fixing portion. When the portable electronic device is disposed at the supporting structure, the portable electronic device and the supporting structure rotate between a first position and a second position relative to the main body via the pivot.

The docking station includes the pivot connected to the main body and the supporting structure, which allows the supporting structure and the portable electronic device rotating relatively to the main body alone the axis of the pivot to stand in vertical.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

A docking station is illustrated with relating figures, and the same symbols denote the same components.

Figure 1:
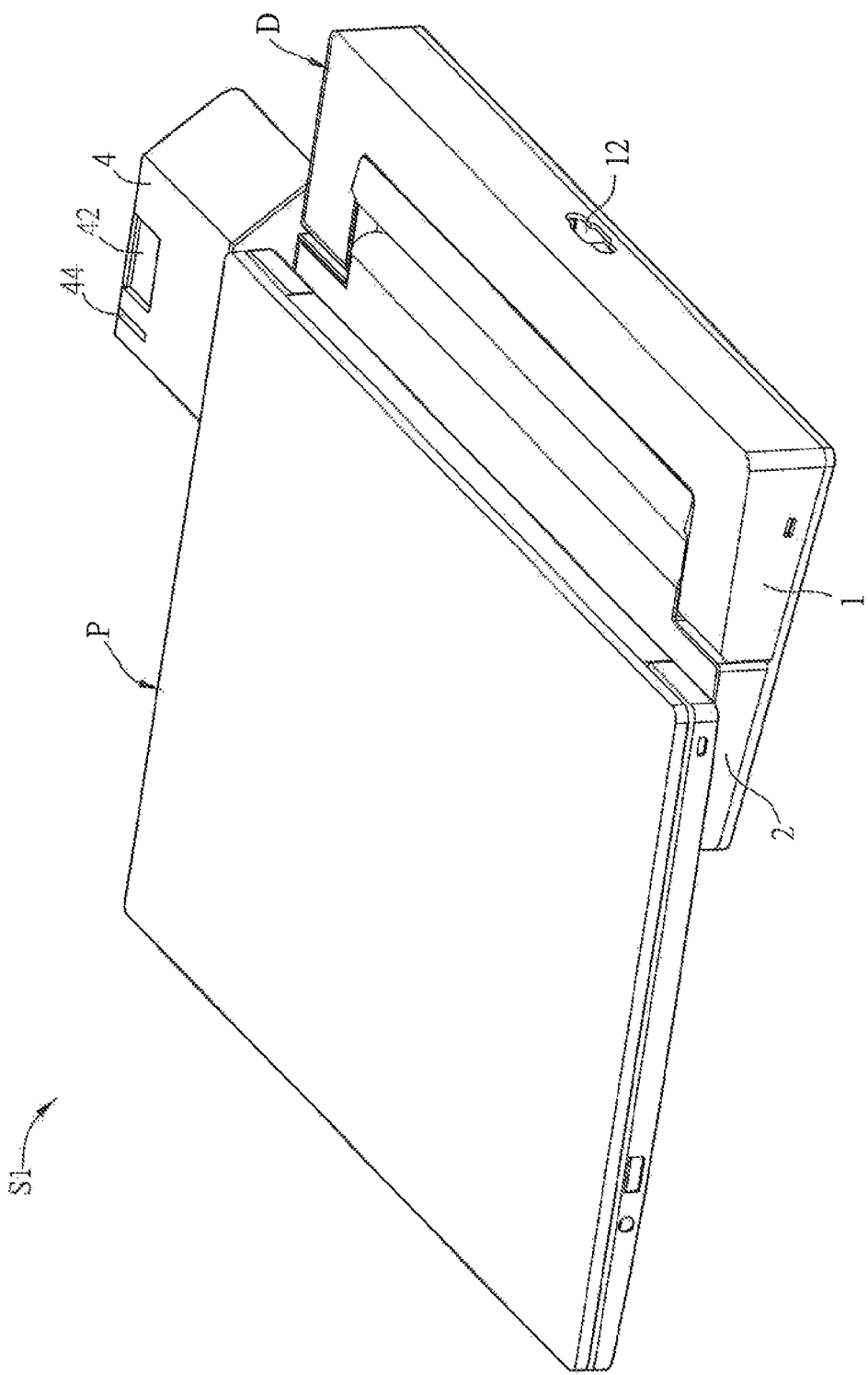
FIG. 1 is a schematic diagram showing a docking station cooperated with a portable electronic device in an embodiment.
Figure 2:
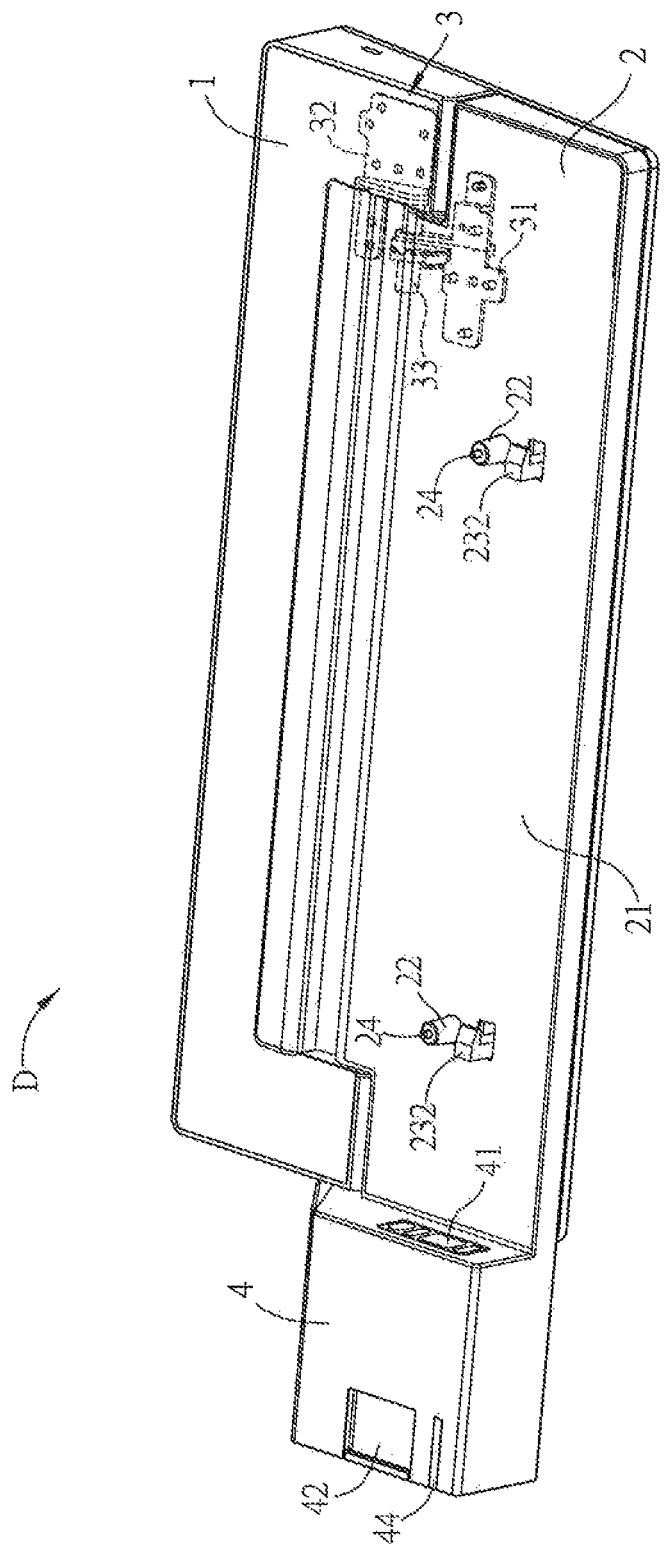
FIG. 2 is a schematic diagram showing the docking station in FIG. 1.

FIG. 1 is a schematic diagram showing a docking station cooperating with a portable electronic device in an embodiment, FIG. 2 is a schematic diagram showing the docking station in FIG. 1 without the portable electronic device. Please refer to FIG. 1 and FIG. 2, a portable electronic device P is electrically connected to a docking station D. If the docking station D is already electrically connected to an expansion device, such as a screen, a keyboard, or a mouse, the expansion device can be operated directly via the docking station D. The portable electronic device P may be a notebook, a tablet computer, which is not limited herein. In the embodiment, a notebook is taken as example.

The docking station D includes a main body 1, a supporting structure 2 and a pivot 3. The portable electronic device P is disposed at a surface 21 of the supporting structure 2. Furthermore, the supporting structure 2 includes a first positioning component 22. In the embodiment, the first positioning component 22 protrudes from the surface 21 (as shown in FIG. 2). In the embodiment, the supporting structure 2 includes two first positioning components 22 which are symmetrically disposed. The portable electronic device P is detachably disposed at the supporting structure 2, for example, the portable electronic device P is magnetically connected to the supporting structure 2, or the portable electronic device P is fastened to the supporting structure 2, which is not limited herein.

The main body 1 is connected to the supporting structure 2 via the pivot 3. The pivot 3 includes a first fixing portion 31, a second fixing portion 32 and a pivot portion 33. The first fixing portion 31 is disposed at the supporting structure 2, the second fixing portion 32 is disposed at the main body 1, and the pivot portion 33 is connected to the first fixing portion 31 and the second fixing portion 32. The pivot 3 in an embodiment is disposed inside the main body 1 and the supporting structure 2, therefore, the pivot 3 is denoted in dashed lines in FIG. 2. In the embodiment, the docking station D includes two pivots 3 which are symmetrically disposed. For a concise purpose, FIG. 2 only shows a pivot 3 at one side (right side).

Figure 3:
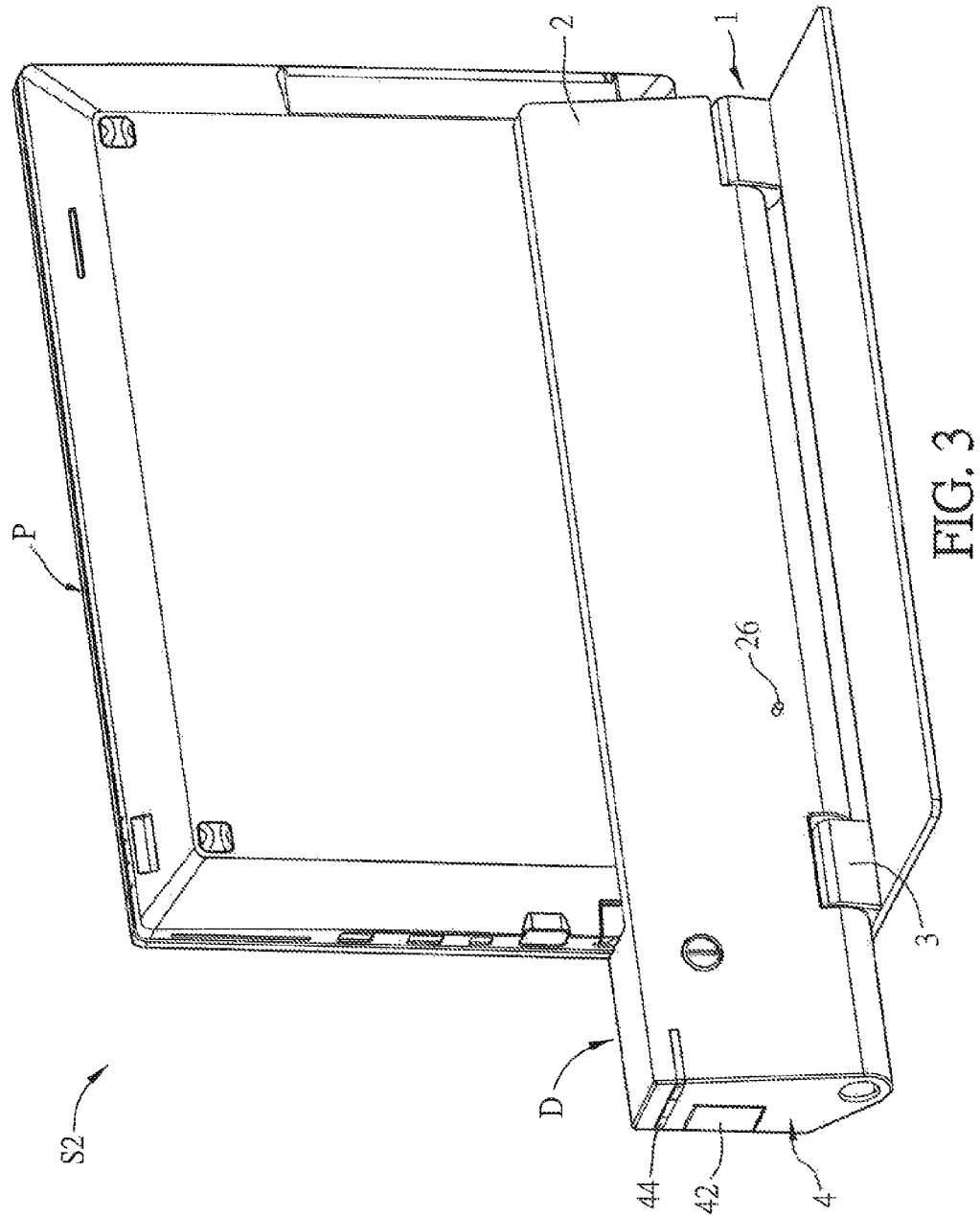
FIG. 3 is a schematic diagram showing the portable electronic device in FIG. 1 and a supporting structure in the vertical state.
Figure 4:
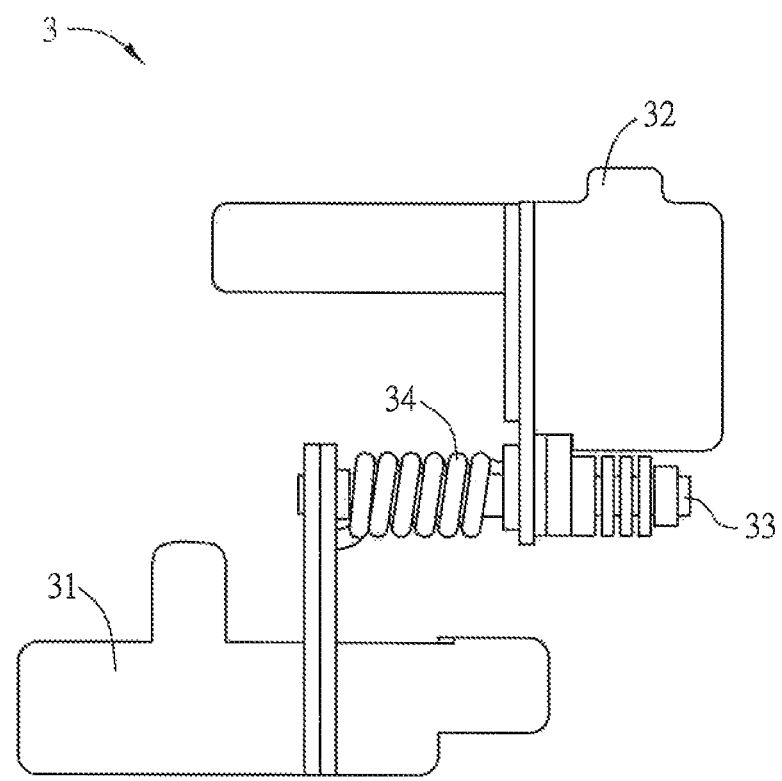
FIG. 4 is a schematic diagram showing an enlarged pivot in FIG. 2.

One end of the first fixing portion 31 is fixed at the supporting structure 2, the other end is sleeved on the pivot portion 33, one end of the second fixing portion 32 is fixed at the main body 1, the other end is also sleeved on the pivot portion 33 (as shown in FIG. 4), which makes both the first fixing portion 31 and the second fixing portion 32 capable of rotating relative to the pivot portion 33, thus allows the supporting structure 2 rotating relative to the main body 1 alone the axis of the pivot 3. Therefore, when the portable electronic device P is disposed at the supporting structure 2, the portable electronic device P and the supporting structure 2 rotates from a first position S1 (that is a horizontal state as shown in FIG. 1) to a second position S2 (that is a vertical state as shown in FIG. 3) via the pivot 3. In the embodiment, the main body 1 is L-shaped. After the portable electronic device P is fixed to the supporting structure 2, it can rotate to the vertical state along with the pivot 3. At the moment, the main body 1 is still at a plane such as a desktop, where docking station D is disposed at, which makes the portable electronic device P still disposed at the plane (such as the surface of a desk) steadily, so as to prevent the portable electronic device P from leaning due to the weight.

FIG. 4 is a schematic diagram showing an enlarged pivot in FIG. 2. As shown in FIG. 4, the pivot 3 further includes an elastic component 34 sleeved on the pivot portion 33, one end of the elastic component 34 is connected to the first fixing portion 31, the other end is connected to the second fixing portion 32. When the supporting structure 2 is in the first position S1 (that is the horizontal state as shown in FIG. 1), the main body 1 and the supporting structure 2 are in the horizontal state, and the angle between the first fixing portion 31 and the second fixing portion 32 is 180°. At the moment, the elastic component 34 is in an expanding state or an extending state, and thus a restoring force for recovering to a balance state is accumulated.

Figure 5A:
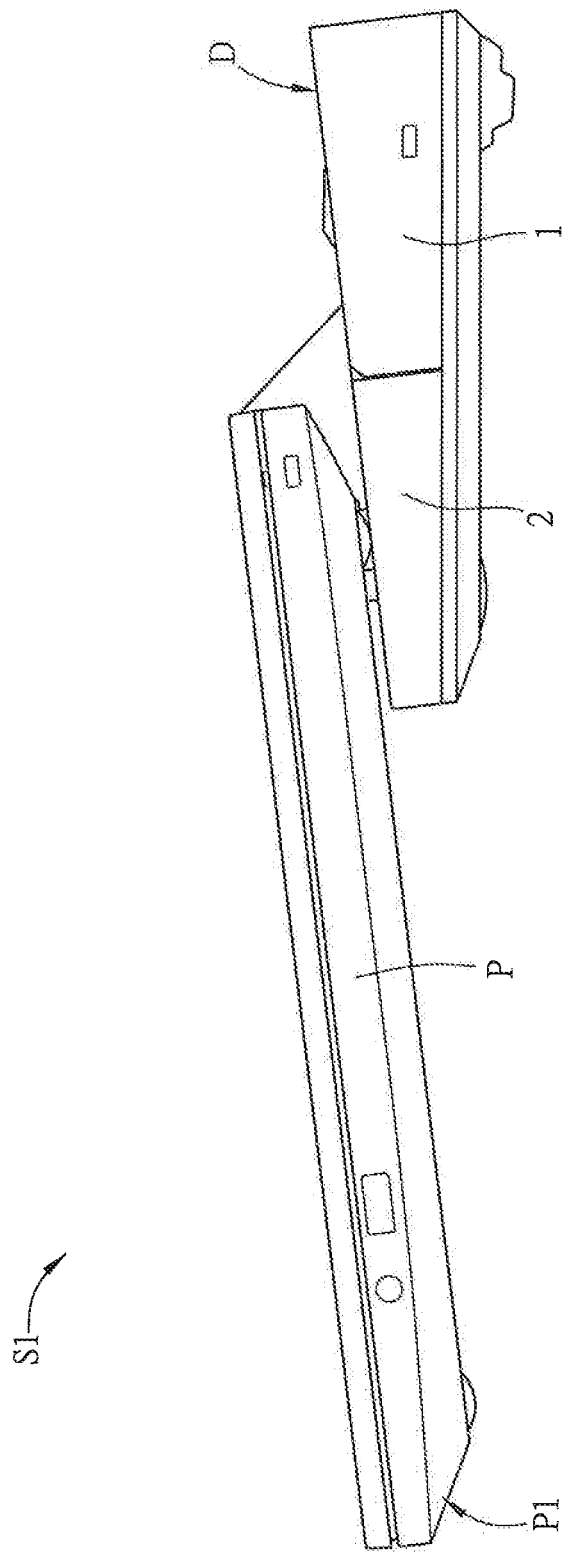
FIG. 5A is a side view showing the docking station and the portable device in FIG. 1.
Figure 5B:
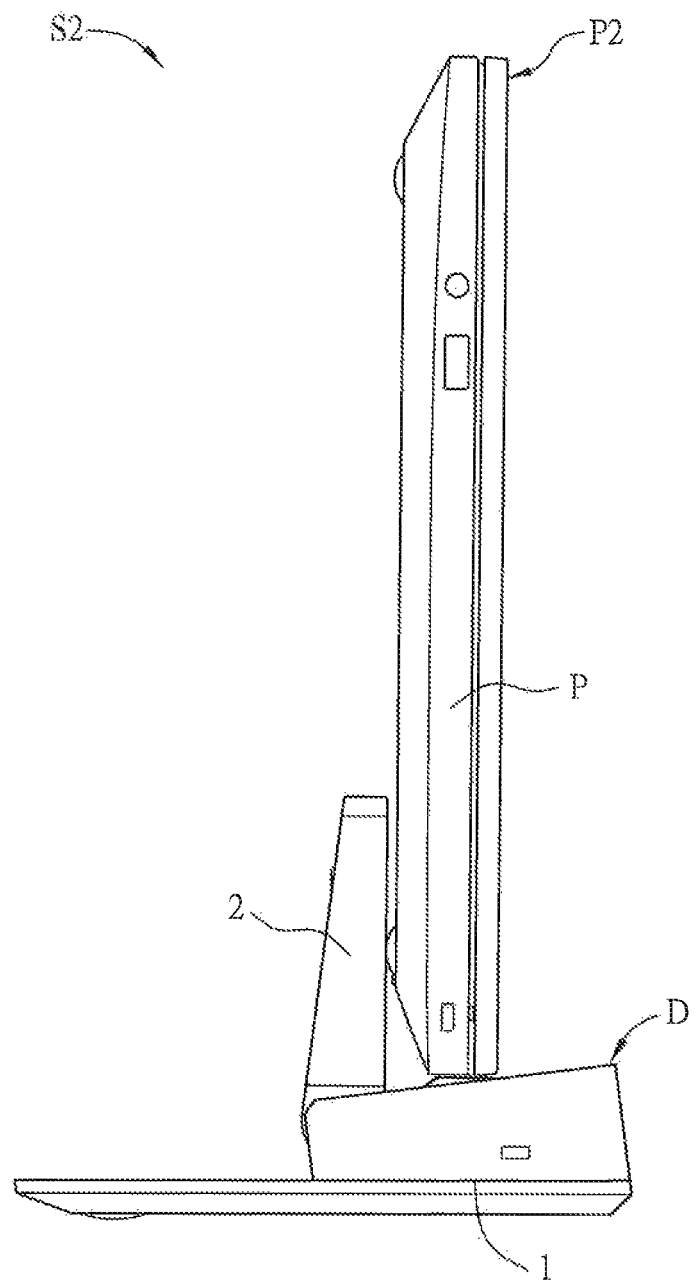
FIG. 5B is a side view showing the docking station and the portable electronic device in FIG. 3.

Refer to FIG. 5A and FIG. 5B. FIG. 5A is a side view showing the docking station and the portable electronic device in FIG. 1, FIG. 5B is a side view showing the docking station and the portable electronic device in FIG. 3. That means, the FIG. 5A is the side view of the supporting structure 2 in the first position S1 (the portable electronic device P is in the horizontal state), and the FIG. 5B is the side view of the supporting structure 2 in the second position S2 (the portable electronic device P is in the vertical state).

As shown in FIG. 5A, when the portable electronic device P is disposed at the docking station D in the horizontal state, the weight of the portable electronic device P forms a power to against the restoring force. To make the portable electronic device P in the vertical state, the user just needs to apply a weak force on a position P1 due to the restoring force accumulated by the elastic component 34, and then the portable electronic device P and the supporting structure 2 are moved to the vertical state, as shown in FIG. 5B. At the moment, the first fixing portion 31 nears the second fixing portion 32, which makes the elastic component 34 go back to the elastic balance state. Therefore, when the portable electronic device P is pushed to move from the vertical state back to the horizontal state, the force should overcome both the power formed by the weight of the portable electronic device P, and the elastic force of the elastic component 34, that means, a stronger force on a position P2 is needed.

Simply, since the restoring force are accumulated by the elastic component 34 in the horizontal state, the user just needs to push on the position P1 (as shown in FIG. 5A) lightly, the portable electronic device P and the supporting structure 2 are moved to the vertical state. At the moment, if the user wants to move it back to the horizontal state, the user should push on the position P2 (as shown in FIG. 5B) in a stronger force to overcome the elastic force of the elastic component 34, and the elastic component 34 will change to the expanding state from the balance state. Consequently, the pivot 3 makes the portable electronic device P change from the horizontal state to the vertical state easily, which saves the horizontal space of the portable electronic device P. Furthermore, with the elastic component 34, the user just needs to push the portable electronic device P in the horizontal state lightly, the portable electronic device P can change to the vertical state, which is labor-saving. Moreover, the operation safety is also taken into consideration, since the user must applied a stronger force to move the portable electronic device P from the vertical state to the horizontal state, users would not worry about whether the steady vertical state is broken while operating the portable electronic device.

Figure 6A:
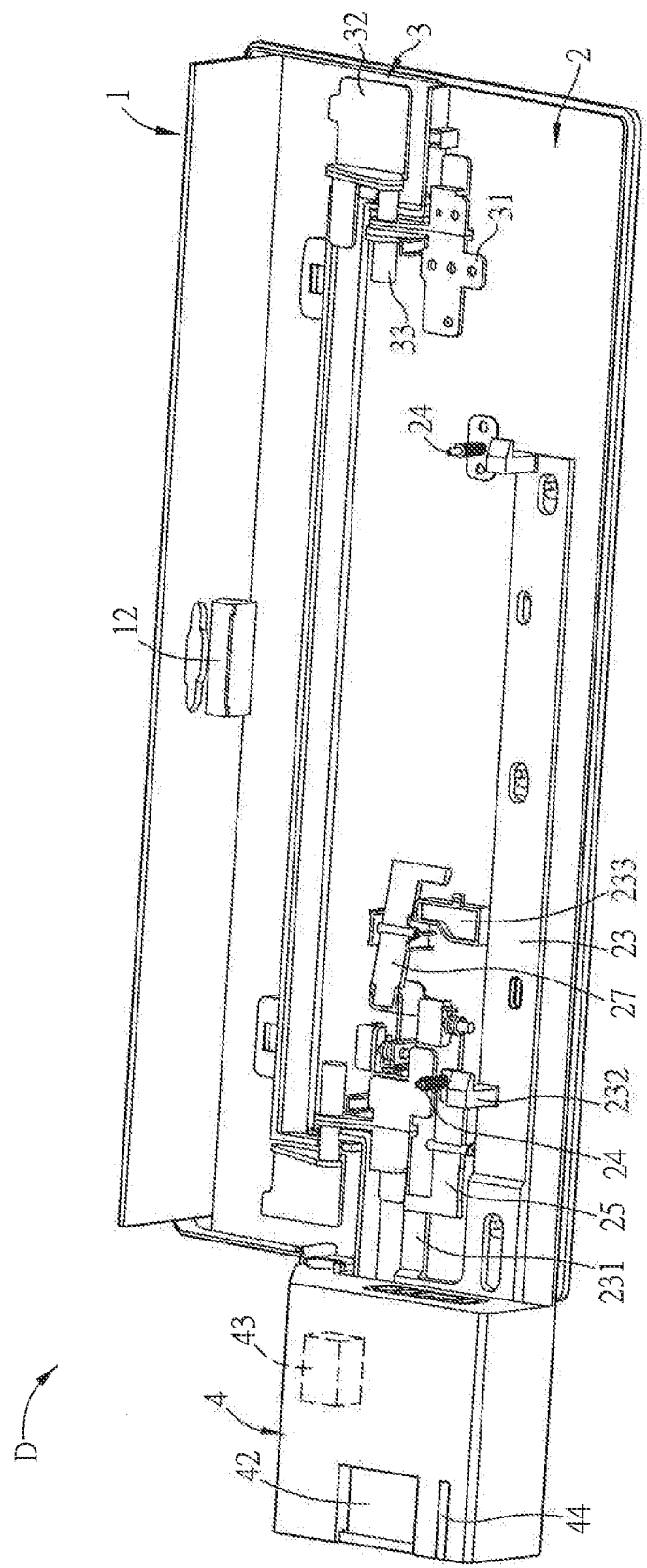
FIG. 6A is a schematic diagram showing the inside configuration of the docking station in FIG. 2.
Figure 6B:
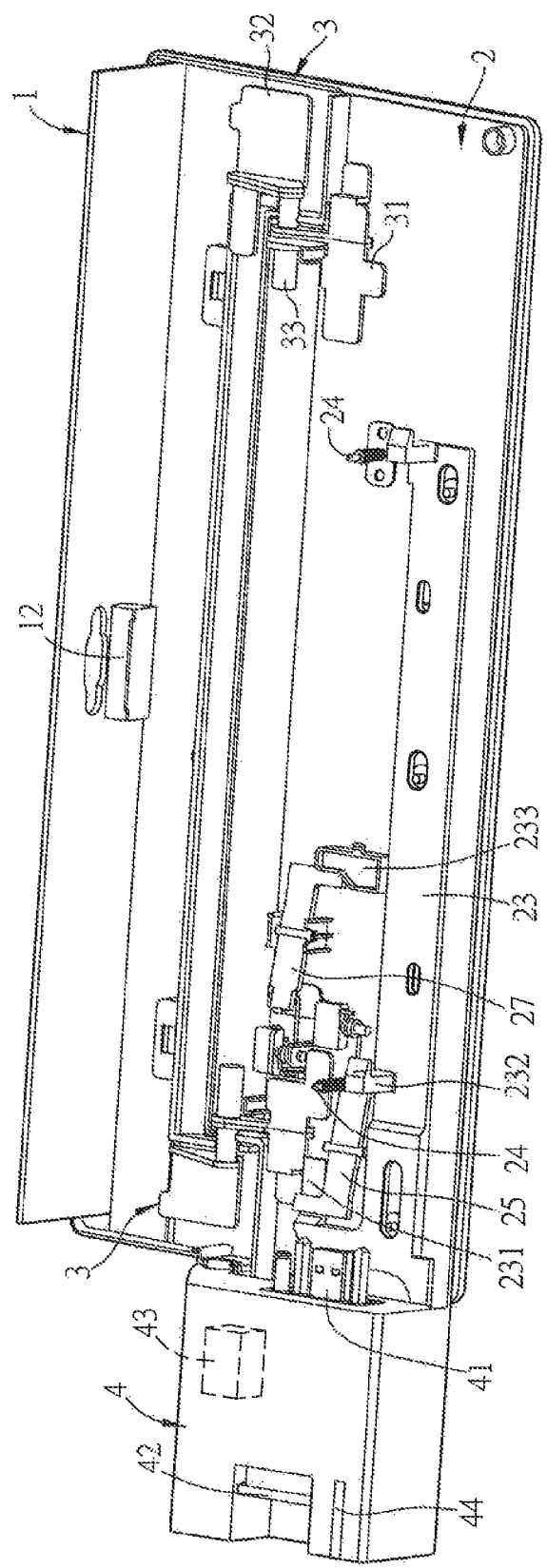
FIG. 6B is a schematic diagram showing the connecting structure in FIG. 6A.

Refer to FIG. 6A and FIG. 6B. FIG. 6A is a schematic diagram showing inside configuration of the docking station in FIG. 2, FIG. 6B is a schematic diagram showing the connecting structure in FIG. 6A work in process. For a concise purpose, FIG. 6A and FIG. 6B only show the detail of the supporting structure 2 at one side (left side in figures). The connecting structure 4 includes a first signal transmitting component 41 and an operating component 42. The first signal transmitting component 41 electrically connects to the portable electronic device P to receive/transmit a signal with the portable electronic device P therebetween. The first signal transmitting component 41 may be a universal serial bus (USB), which is not limited herein. Therefore, the first signal transmitting component 41 is preferably disposed at the position that corresponding to a USB port of the portable electronic device P (as shown in FIG. 1).

The first signal transmitting component 41 is cooperated with the operating component 42, that means, the first signal transmitting component 41 and the operating component 42 are linked to each other, which makes the operating component 42 drive the first signal transmitting component 41 to electrically connect to the portable electronic device P. In detail, when a force is applied on the operating component 42, the operating component 42 drives the first signal transmitting component 41 to move, which makes the first signal transmitting component 41 protrude from the connecting structure 4, as shown in FIG. 6B, the first signal transmitting component 41 is electrically connected to the portable electronic device P. In the embodiment, that is, the first signal transmitting component 41 is plugged into the USB port of the portable electronic device P, and signals can be transmitted between the docking station D and the portable electronic device P.

In the embodiment, the connecting structure 4 is disposed at the supporting structure 2, the connecting structure 4 is in the horizontal state or in the vertical state via the supporting structure 2 along with the rotation of the portable electronic device P. In other words, if the user wants to change the portable electronic device P from the horizontal state to the vertical state, it does not need to disassemble the first signal transmitting component 41 and rotate the supporting structure 2. That means, the portable electronic device P in the vertical state is electrically connected to the docking station D continuously via the first signal transmitting component 41, and the signals are still transmitted to each other, and thus the portable electronic device P in the vertical state can operate normally. Additionally, the main body 1 includes a second signal transmitting component 12 to connect to other expansion devices, such as a screen, a keyboard, a mouse, which is not limited herein. In the embodiment, the main body 1 of the docking station D may include multiple second signal transmitting components 12, and only one block is shown for a concise purpose. Therefore, after the portable electronic device P is changed to the vertical state, the portable electronic device P can still be used by operating the expansion device, and thus the space is saved.

The connecting structure 4 includes an input/output integrated circuit 43 to control a power switch of the portable electronic device P. The input/output integrated circuit 43 is coupled to the first signal transmitting component 41, and thus the input/output integrated circuit 43 can output a power-on signal or a power-off signal, and the signal is transmitted to the portable electronic device P via the first signal transmitting component 41. A power button 44 may be disposed at the connecting structure 4, and the power button 44 is connected to the integrated circuit 43, and then the power of the portable electronic device P can be controlled by directly pressing the power button 44. If the portable electronic device P is in the vertical state, the portable electronic device P (a notebook is taken as an example) must be changed to the horizontal state first, and then the power button of the portable electronic device P can be pressed.

In the embodiment, the supporting structure 2 further includes a linkage component 23, a first limiting component 24 and a second limiting component 25. The linkage component 23 is cooperated with the operating component 42, and the cooperation herein means the non-fixed connection or the fixed connection in structure cooperation, which is not limited herein, so as to make the operating component 42 and the linkage component 23 move simultaneously. The first limiting component 24 and the second limiting component 25 may be changed between a first state and a second state. As shown in FIG. 6A, in the embodiment, the first state is that the portable electronic device P is not disposed at the docking station D; and the second state is that the portable electronic device P is disposed at the docking station D and the portable electronic device in the horizontal state, as shown in FIG. 6B.

Figure 7A:
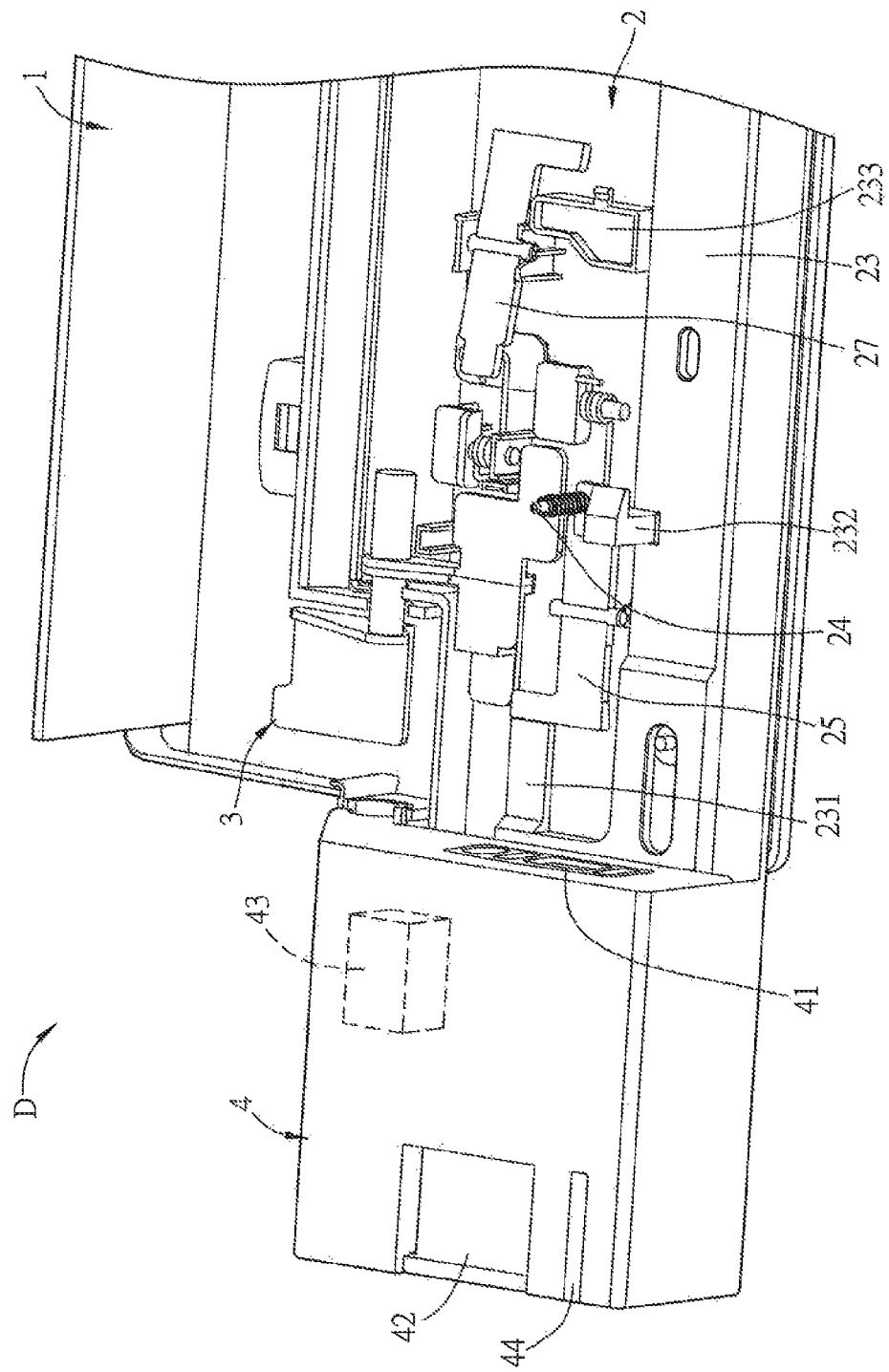
FIG. 7A is an enlarged view of partial of the expansion device in FIG. 6A.
Figure 7B:
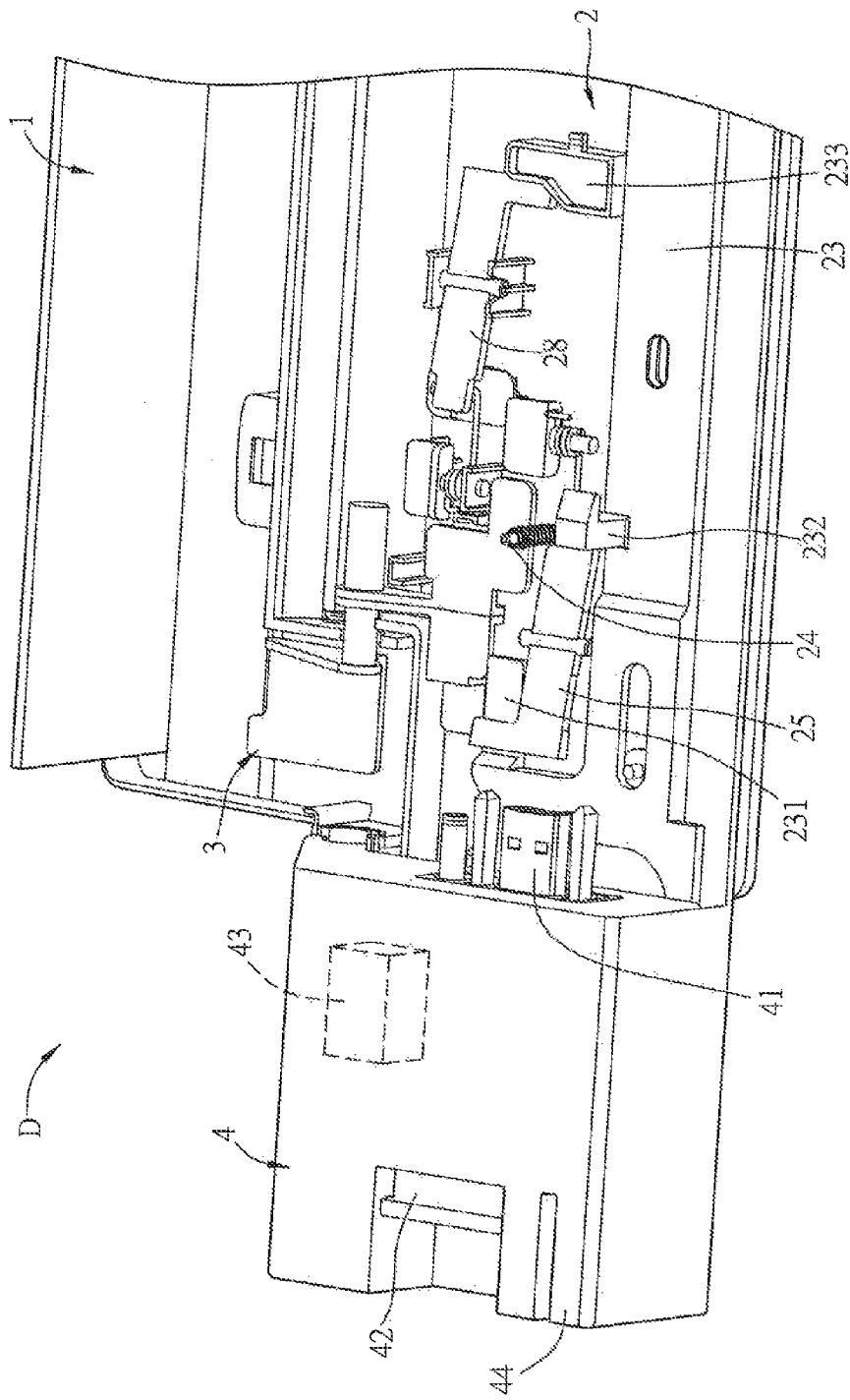
FIG. 7B is an enlarged view of partial of the expansion device in FIG. 6B.

FIG. 7A is an enlarged view of partial of the expansion device in FIG. 6A, FIG. 7B is an enlarged view of partial of the expansion device in FIG. 6B. FIG. 6A and FIG. 7A show the operating component 42 is not pressed, FIG. 6B and FIG. 7B are schematic diagrams show the operating component 42 is pressed. Please refer to FIG. 2, FIG. 7A and FIG. 7B, the first limiting component 24 penetrates through and disposed inside the first positioning component 22, and one end of the first limiting component 24 protrudes from the surface of the first positioning component 22 (as shown in FIG. 2), and the other end is disposed corresponding to the second limiting component 25. When the portable electronic device P is not disposed at the docking station D, the one end of the second limiting component 25 is not pressed by the first limiting component 24, and thus the second limiting component 25 is in the horizontal state (the first state), at the time, the other end of the second limiting component 25 abuts against the linkage component 23, that is, the other end of the second limiting component 25 abuts against a first convex portion 231 of the linkage component 23. At the moment, the operating component 42 cannot be pressed (as shown in FIG. 7A).

When the portable electronic device P is disposed at the docking station D, and the portable electronic device P is in the horizontal state, one end of the second limiting component 25 abuts against the first limiting component 24 and therefore in the inclined state (the second state), and thus the other end of the second limiting component 25 does not contact with the first convex portion 231 of the linkage component 23. Therefore, at the moment, the operating component 42 can be pressed and move with the linkage component 23 simultaneously (as shown in FIG. 7B). In the embodiment, the second limiting component 25 is a seesaw structure, which is not limited herein.

Simply, when the portable electronic device P is not disposed at the docking station D, the first limiting component 24 is not pressed by the portable electronic device P, and thus the first limiting component 24 can keep the state of protruding from the surface of the first positioning component 22. Thus, the first limiting component 24 would not press the second limiting component 25, which makes the second limiting component 25 be in the horizontal state to abut against the first convex portion 231 of the linkage component, so as to limit the movement of the linkage component 23. Since the first signal transmitting component 41, the operating component 42 and the linkage component 23 are a linkage structure, the linkage component cannot move when the first limiting component 24 is in the first state, and thus the operating component 42 and the first signal transmitting component 41 also cannot move. That means, the user cannot press the operating component 42 if the portable electronic device P is not disposed at the docking station D, which can avoid that the first signal transmitting component 41 protrudes from the connecting structure 4.

In addition, in order to keep the portable electronic device P in the vertical state steadily, in the embodiment, the linkage component 23 further includes a fastening component 232. When the operating component 42 drives the linkage component 23 to move, the fastening component 232 moves simultaneously and is fastened to the portable electronic device P. In the embodiment, the fastening component 232 is a hook, and the fastening component 232 protrudes from the surface 21 of the supporting structure 2 (as shown in FIG. 2). The bottom of the portable electronic device P includes a hole which is corresponding to the fastening component 232 (not shown). The size of the hole is corresponding to that of the fastening component 232, and the position of the hole is corresponding to that of fastening component 232 when the operating component 42 is not pressed (as shown in FIG. 6A). Therefore, when the portable electronic device P is disposed at the supporting structure 2 corresponding to the first positioning component 22 and the operating component 42 is pressed, the linkage component 23 is driven to move. The fastening component 232 is driven to fastened to the portable electronic device P (that is the action of FIG. 6A to FIG. 6B), so as to make the portable electronic device P disposed at the supporting structure 2 steadily.

Figure 8:
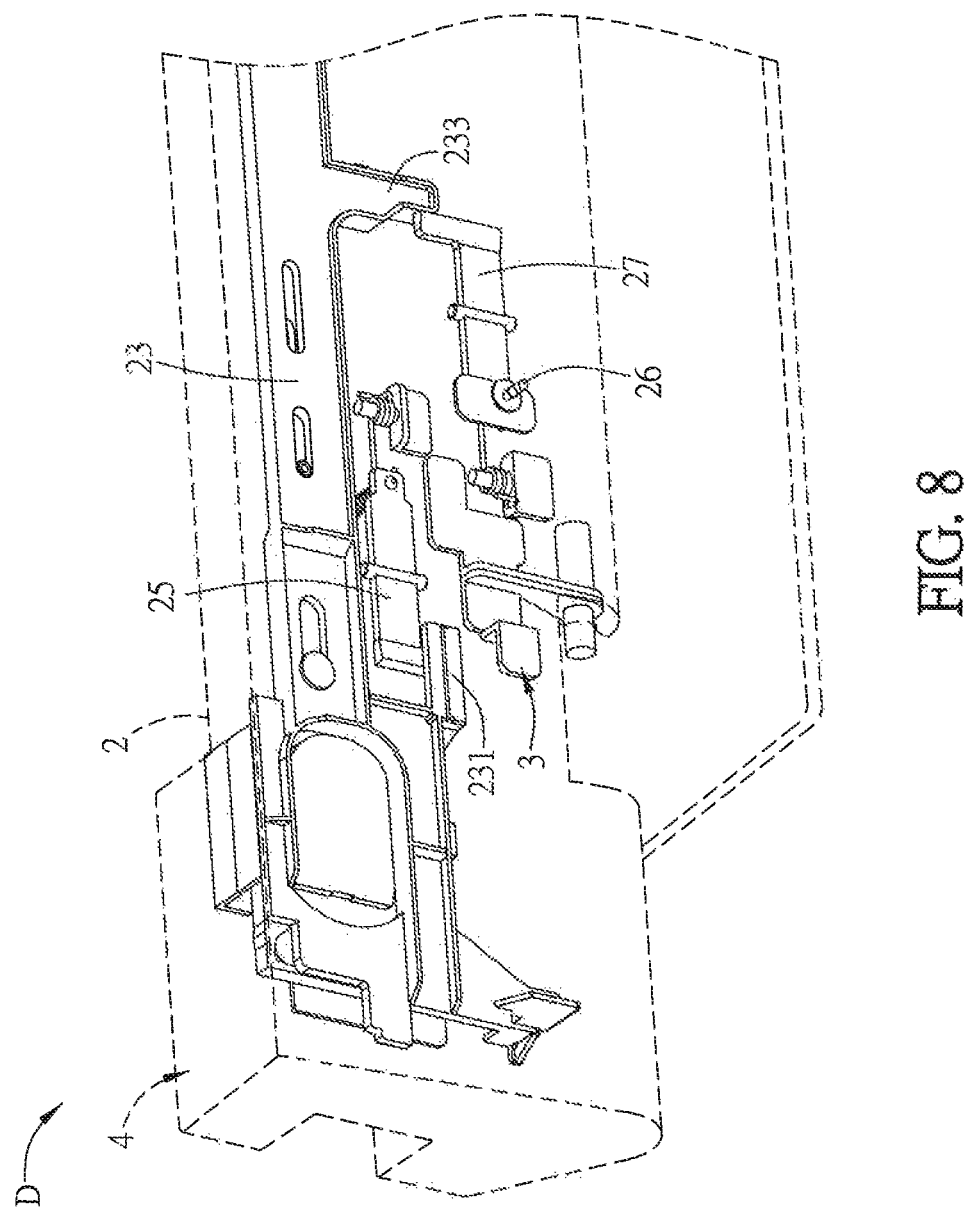
FIG. 8 is an enlarged view of showing partial of the expansion device in the vertical state in FIG. 7B.

FIG. 8 is an enlarged view of partial of the expansion device in the vertical state in FIG. 7B. For a concise purpose, the outline of the expansion device is denoted in dashed lines, the inside of the supporting structure is denoted in solid lines.

As shown in FIG. 8, in the embodiment, the supporting structure 2 further includes a third limiting component 26 and a fourth limiting component 27. The third limiting component 26 and the fourth limiting component 27 can be changed between a third state and a fourth state. In detail, in the embodiment, the third state is similar to the second state that the portable electronic device P is in the horizontal state (as shown in FIG. 6B and FIG. 7B); the fourth state is that the portable electronic device P is in the vertical state (as shown in FIG. 8). When the third limiting component 26 penetrates through the bottom of the supporting structure 2, the portable electronic device P is in the horizontal state, one end of the third limiting component 26 abuts against the main body 1, and then the other end of the third limiting component 26 protrudes from the supporting structure 2, which is at one side of the supporting structure 2 corresponding to the portable electronic device P. At the moment, one end of the fourth limiting component 27 abuts against protruding of the third limiting component 26 (the third limiting component 26 is shielded by the fourth limiting component 27 and not shown in FIG. 7B), which makes the other end of the fourth limiting component 27 not contact with the linkage component, that is, the other end does not contact with the second convex portion 233 of the linkage component 23.

As stated above, in the embodiment, the fourth limiting component 27 is also a seesaw structure. When the fourth limiting component 27 abuts against the third limiting component 26 to be in the inclined state, it does not contact with the linkage component 23, which is in the third state; when the fourth limiting component 27 does not abut against the third limiting component 26 to be in the horizontal state, the fourth limiting component 27 can limit the linkage component 23, which is in the fourth state.

Consequently, in the embodiment, as shown in FIG. 6B, when the portable electronic device P is in the horizontal state, one end of the third limiting component 26 abuts against the main body 1, and then the other end of the third limiting component 26 protrudes from the supporting structure 2, this protruding end of the third limiting component 26 upwardly abuts against one end of the fourth limiting component 27, and then the other end of the fourth limiting component 27 is pushed downwardly to be in the inclined state, and it does not contact with the second convex portion 233 of the linkage component 23, as a result, the linkage component 23 can move leftward and rightward. As shown in FIG. 8, when the portable electronic device P is in the vertical state, the main body 1 is still at a plane (such as surface of the desk), which makes one end of the third limiting component 26 not pressed by the main body 1, and thus the other end of the third limiting component 26 cannot abut against the fourth limiting component 27, and then the fourth limiting component 27 is in the horizontal state. The fourth limiting component 27 in the horizontal state can limit the linkage component 23, that means, one end of the fourth limiting component 27 can abut against the second convex portion 233 of the linkage component 23 to limit the movement of the linkage component 23. Since the first signal transmitting component 41, the operating component 42 and the linkage component 23 are a linkage structure, both the third limiting component 26 and the fourth limiting component 27 cannot move in the fourth state. That means, the user cannot withdraw the operating component 42 when the portable electronic device P is in the vertical state, which avoids that the first signal transmitting component 41 disconnects from the USB pert of the portable electronic device P, and then the portable electronic device P in the vertical state also can be operated.

In sum, according to the electronic device and the docking station in embodiments, the docking station includes the pivot connected to the main body and the supporting structure, which makes the supporting structure and the portable electronic device rotating relative to the main body alone the axis of the pivot to be in the vertical state.

In addition, since the connecting structure is disposed at the supporting structure, the portable electronic device in the vertical state also can be electrically connected to the docking station and have signals transmission therebetween, and thus the portable electronic device in the vertical state also can be operated via other expansion devices (such as screen, a keyboard, a mouse).

Further, the pivot includes the elastic component, when the elastic component is in the horizontal state, the elastic component is in the expanding state or the extending state, and the elastic component accumulates the restoring force via the weight of the portable electronic device. The user just needs to apply a weak force on the portable electronic device, the portable electronic device and the supporting structure are moved to the vertical state, at the moment, the elastic component is in the balance state. If the user wants to make the portable electronic device move back to the horizontal state, the user should push the portable electronic device in a stronger force to overcome the elastic force of the elastic component, so as to change the elastic component from the balance state to the expanding state. Therefore, with the elastic component, it just needs to pull the portable electronic device lightly to make the portable electronic device from the horizontal state to the vertical state, which is labor-saving. The operation safety is also taken into consideration, since and the user must push the portable electronic device P in the vertical state in a stronger force to make it restore to the horizontal state.

Although the invention has been disclosed with reference to certain preferred embodiments thereof, the disclosure is not for limiting the scope. Persons having ordinary skill in the art may make various modifications and changes without departing from the spirit and the scope of the invention. Therefore, the scope of the appended claims should not be limited to the description of the preferred embodiments described above.

What is claimed is:

1. A docking station for a portable electronic device, the docking station comprises:
   a main body;
   a supporting structure;
   a connecting structure disposed at the supporting structure, wherein the connecting structure includes a first signal transmitting component and an operating component, and the first signal transmitting component is cooperated with the operating component; and
   a pivot, including:
   a first fixing portion and a second fixing portion, wherein the first fixing portion is disposed at the supporting structure, and the second fixing portion is disposed at the main body; and
   a pivot portion, connected to the first fixing portion and the second fixing portion;
   wherein when the portable electronic device is disposed at the supporting structure, the portable electronic device and the supporting structure rotate between a first position and a second position relative to the main body via the pivot,
   wherein the supporting structure further includes:
   a linkage component, wherein the linkage component is cooperated with the operating component and includes a fastening component, the operating component drive the linkage component moved, and the fastening component is fastened to the portable electronic device;
   a first limiting component, disposed at a first positioning component; and
   a second limiting component, wherein one end of the second limiting component is disposed at an end of the first limiting component which is near to a bottom of the supporting structure,
   wherein the first limiting component and the second limiting component are changed between a first state and a second state, the first state is that the first limiting component protrudes from the first positioning component, the other end of the second limiting component abuts against the linkage component, and the second state is that the first limiting component is pressed by the portable electronic device to abut against one end of the second limiting component and the other end of the second limiting component does not contact with the linkage component.

2. The docking station according to claim 1, wherein the pivot further includes an elastic component sleeved on the pivot portion, one end of the elastic component is connected to the first fixing portion, and the other end of the elastic component is connected to the second fixing portion.

3. The docking station according to claim 1, wherein the operating component drives the first signal transmitting component to electrically connected to the portable electronic device.

4. The docking station according to claim 1, wherein the supporting structure further includes:
   a third limiting component, penetrated through a bottom of the supporting structure, wherein the third limiting component abuts against the main body to protrude from the supporting structure; and
   a fourth limiting component, wherein the fourth limiting component and the third limiting component are changed between a third state and a fourth state, the third state is that one end of the fourth limiting component abuts against a protruding of the third limiting component, the other end does not contact with the linkage component, the fourth state is that one end of the fourth limiting component is connected to the bottom of the supporting structure, the other end limits the linkage component.

5. The docking station according to claim 1, wherein the connecting structure includes an integrated circuit coupled to the first signal transmitting component.

* * * * *